J. CARRIER.
Tobacco Hangers.
No. 133,755.             Patented Dec. 10, 1872.
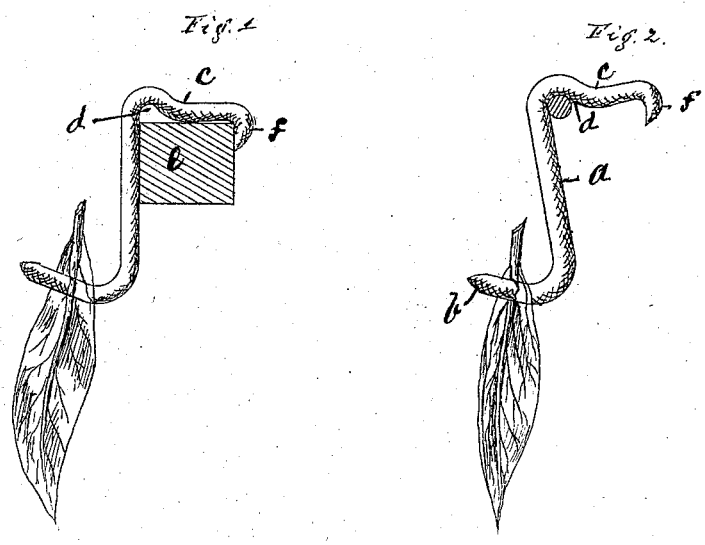
Witnesses.
Inventor.

UNITED STATES PATENT OFFICE.

JOSEPH CARRIER, OF MARLBOROUGH, CONNECTICUT.

IMPROVEMENT IN TOBACCO-HANGERS.

Specification forming part of Letters Patent No. 133,755, dated December 10, 1872.

*To all whom it may concern:*

Be it known that I, JOSEPH CARRIER, of Marlborough, in the county of Hartford and State of Connecticut, have invented certain Improvements in Devices for Hanging or Suspending Articles from Rectangular Bars and Circular Rods, of which the following is a specification:

My invention relates to the construction of metallic hooks; and consists in the peculiar form or shape in which they are made, whereby they are adapted for suspending articles either from a rectangular bar or round rod with equal facility and security, and without the use of nails or screws, so that they may be readily removable from the suspending bar or rod as desired. These hooks are specially adapted and intended to be used for hanging tobacco-plants during the process of curing.

In the accompanying drawing, Figure 1 is a side view of one of these hangers clasping a square or rectangular bar and holding a stalk of tobacco. Fig. 2 is a side view of a hanger hooked onto a round rod and holding a stalk of tobacco.

*a* is a metal hanger. The lower prong *b* is made in hook form, and pointed at the end, so that it can be easily driven or pressed into the stalk or branch of the tobacco-plant. *c* is the upper prong of the hanger, having a hook depression, *d*, in the angle or close to the body of the hanger. This bend or depression *d* is the part of the hanger which serves as a hook when the plants are suspended on wires or circular rods when wooden or rectangular bars are used. This prong *c* takes bearing on the top of the bar, and its outer end is formed into a dog, *f*, which serves to clasp the bar *e;* or, if the bar is too wide to be clasped, it (the dog *f*) may be compressed into the upper surface of the bar, thus preventing the hanger from losing its hold upon the rectangular bar.

By the use of this invention I am enabled to greatly lessen the labor of hanging tobacco, the yearly expense of twine, and the irksome labor of tying.

What I claim as my invention is—

A hook or hanging device, constructed as described, with lower prong *b*, circular bend or depression *d*, and dog *f*, for the purpose specified.

JOSEPH CARRIER. [L. S.]

Witnesses:
 E. W. BLISS,
 JEREMY W. BLISS.